Mar. 3, 1925. 1,528,117
W. A. LAYCOCK ET AL
CIRCUIT MAKER AND BREAKER
Filed Jan. 6, 1923 2 Sheets-Sheet 1
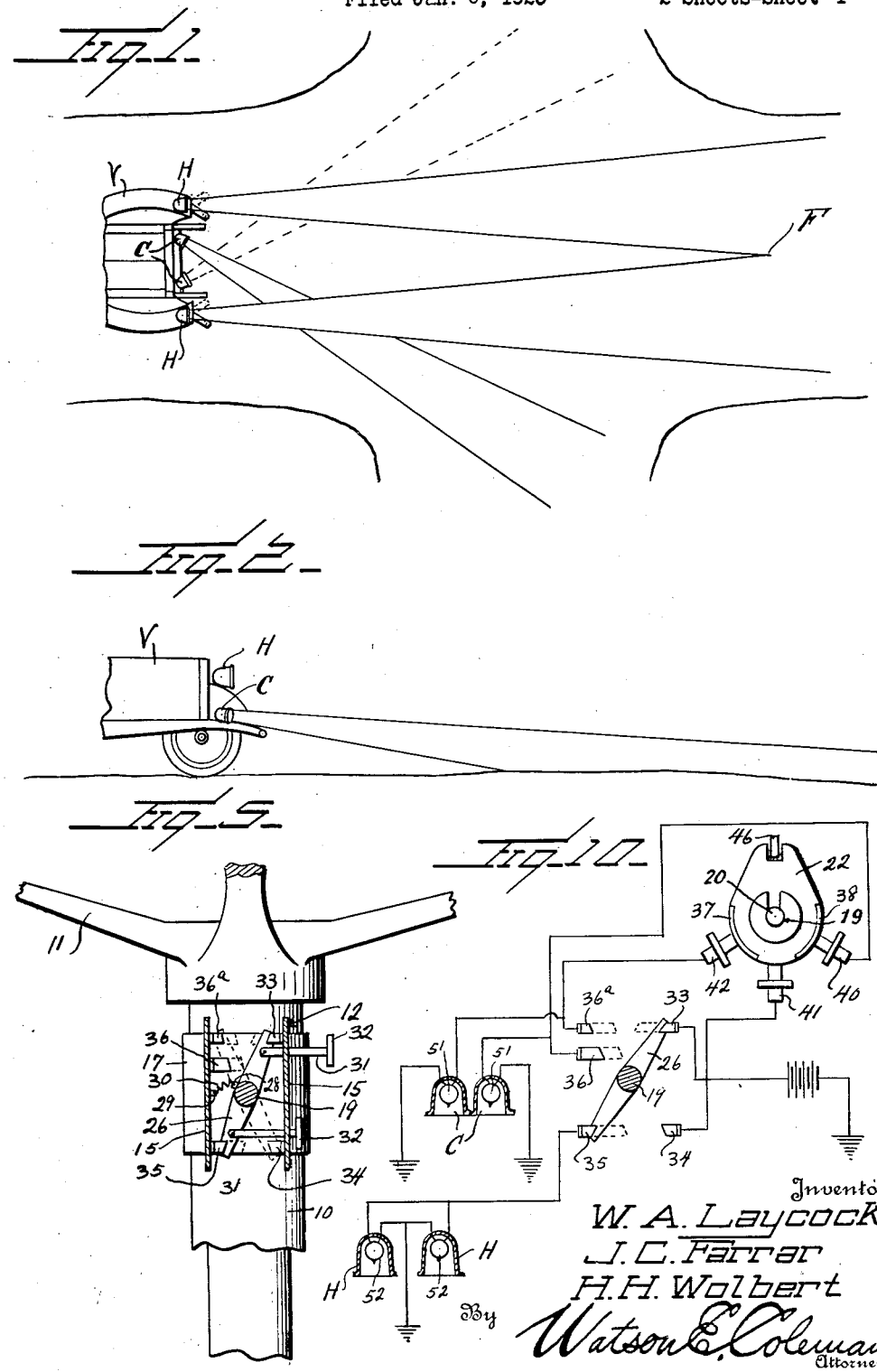

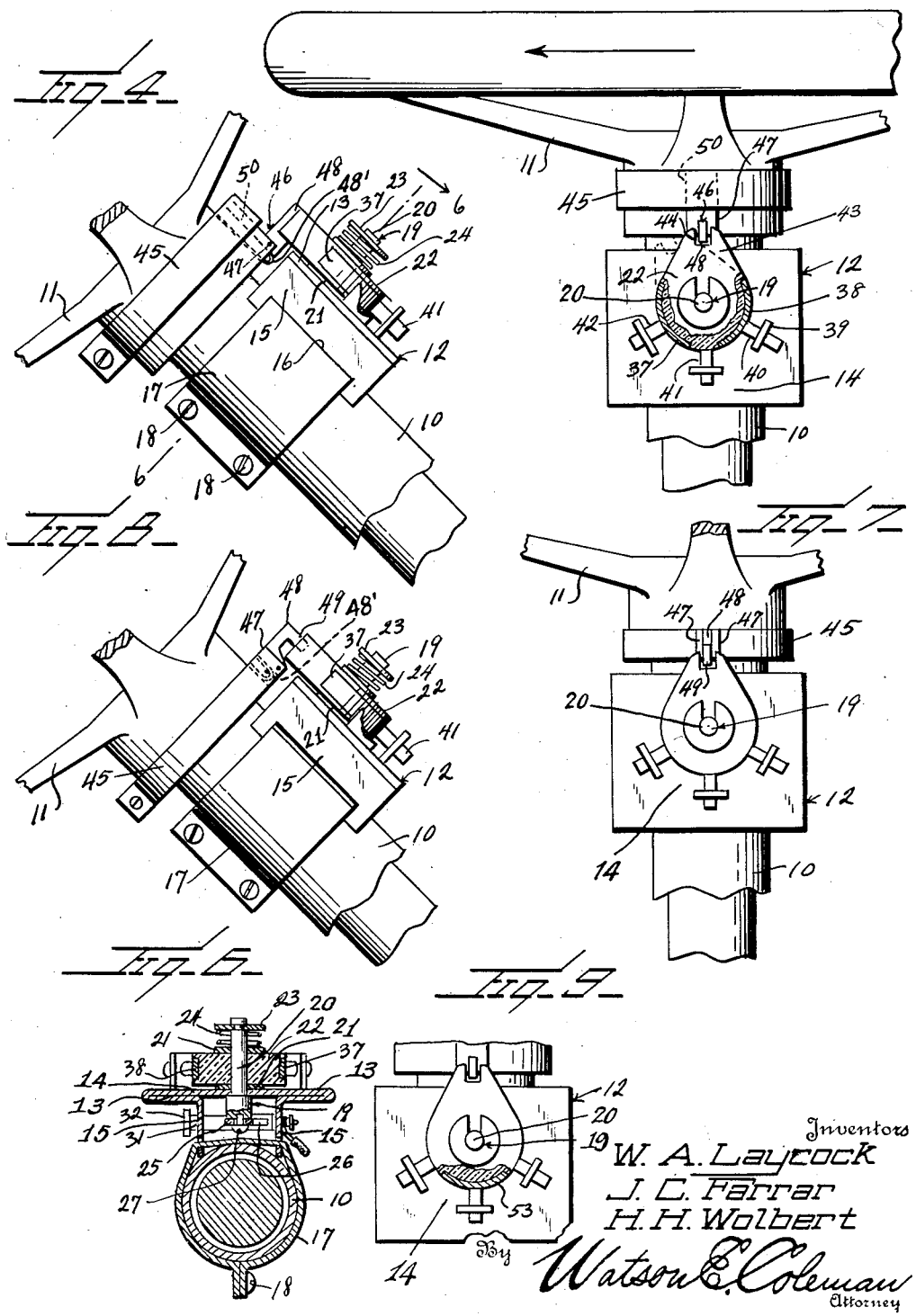

Patented Mar. 3, 1925.

1,528,117

UNITED STATES PATENT OFFICE.

WILBUR A. LAYCOCK, JOHN C. FARRAR, AND HARRY H. WOLBERT, OF DELTA, COLORADO, ASSIGNORS TO MOTOR CURVE LIGHT COMPANY, OF DELTA, COLORADO, A CORPORATION OF COLORADO.

CIRCUIT MAKER AND BREAKER.

Application filed January 6, 1923. Serial No. 611,056.

*To all whom it may concern:*

Be it known that we, WILBUR A. LAYCOCK, JOHN C. FARRAR, and HARRY H. WOLBERT, citizens of the United States, residing at Delta, in the county of Delta and State of Colorado, have invented certain new and useful Improvements in Circuit Makers and Breakers, of which the following is a specification, reference being had to the accompanying drawings.

This invention relates to circuit makers and breakers, and more particularly to devices of this character for controlling the lighting systems of automobiles.

An important object of this invention is to provide a switch for accomplishing control of the road illumination means of a vehicle which embodies a pair of ordinary headlights and a pair of curve lights such as described in our co-pending application for road illumination control for vehicles, filed January 6, 1923, Serial No. 611,055.

In the above identified application we have described a control system for controlling the headlights of an automobile and for controlling a pair of curve lights or lights which direct rays to the side of the road upon which the vehicle is traveling. As set forth in this application, the control means is necessarily partially manual and partially automatic, and an important object of this invention is to provide a combined switch structure which is readily adjustable to the steering post of a vehicle so that it may be accessible to the driver of the vehicle and which embodies both an automatic and a manual control for such curve lights.

A further object of the invention is to provide a compound switch of this character which may be very cheaply constructed, which will be strong and durable in service, and the parts of which may be so situated as to in no manner interfere with the normal operation of the vehicle.

A still further object of the invention is to provide a device of this character which is applicable to the steering posts of vehicles of different constructions without in any manner altering the same.

These and other objects we attain by the construction and arrangement shown in the accompanying drawings wherein for the purpose of illustration is shown a preferred embodiment of our invention and wherein like reference characters designate like parts throughout.

In the drawings:—

Figure 1 is a plan view showing an automobile provided with curve lights and the control thereof possible with our switch;

Figure 2 is a side elevation showing the direction of the beams of the curve lights;

Figure 3 is a plan view partially in section of a switch constructed in accordance with our invention;

Figure 4 is a side elevation thereof;

Figure 5 is a detail sectional view showing the manually operated portion of the switch;

Figure 6 is a vertical sectional view through the switch;

Figure 7 is a detail plan view showing a slightly modified form of attachment for the operating finger for the automatic switch;

Figure 8 is a side elevation of the structure shown in Figure 7;

Figure 9 is a detail view partially in section showing a modified construction of the automatic switch, and Figure 10 is a wiring diagram showing the connections employed.

Referring now more particularly to the drawings, V designates a vehicle having the usual headlights H and provided in addition to such headlights with curve lights C. The curve lights C are arranged at the sides of the vehicle at the front thereof so as to direct the rays thereof downwardly upon the road, as indicated in Figure 2. It will be noted that the rays passing from these lights as indicated in this figure all remain below a plane passing through the upper portion of the light and paralleling the road upon which the vehicle is traveling. The headlights H will focus upon the road at a point approximately indicated by the character F and in the usual manner. The numeral 10 designates the steering post housing of the vehicle and 11 the steering wheel.

In the construction of our switch we provide a housing 12 formed from a single strip of metal which has its ends bent back upon itself, as indicated at 13, thus providing a central table portion 14. At points spaced inwardly from the sides of this table portion the ends of the strip of metal are down bent, as indicated at 15, to form side walls for the housing. The lower ends of these side walls have slots 16 formed therein extending substantially for the entire breadth of the strip from which the housing is formed and which are adapted for the reception of a clamping band 17 by means of which the housing may be secured upon the steering post housing 10. This band is in the form of a continuous strip of metal which is inserted through the slot 16 and then bent about the housing 10, the ends of the band being outturned to form ears through which a securing element may be extended, as indicated at 18.

Mounted in the housing 12 approximately centrally thereof is a shaft 19, the shaft having upon one end a reduced portion 20 which is inserted through an opening formed in the table 14 from the interior of the housing so that the shoulder thereof comes in engagement with the under surface of the table. This reduced portion is surrounded next adjacent the table 14 by a washer 21 forming a support for a disk 22 of insulating material. The upper end of the reduced portion 20 is provided with an enlarged removable head 23 and between this head and the upper surface of the disk 22 a spring 24 extends so as to normally prevent rotation of the disk 22 upon the shaft 19 and likewise to maintain the shoulder formed by the reduction of the shaft in engagement with the under surface of the table 14. The lower end of the shaft 19 is reduced, as indicated at 25, and has rotatably mounted thereon a bar 26 of conducting material which is held in position by a removable enlarged head 27 engaging the lower end of the shaft. The bar 26 swings in a plane paralleling or approximately paralleling the table 14 and is provided at a point aligning with its pivot with a lug 28. Between this lug 28 and a similar lug 29 formed upon the opposed wall of the housing 12 a compression spring 30 extends. The bar 26 has pivotally connected thereto a pair of stems 31, one stem being arranged adjacent each end of the bar and these stems extending through openings formed in the wall of the housing and having upon their outer ends heads 32. These heads form a means of operation for the bar 26 which by means of the same may have an initial movement imparted thereto. It is pointed out that after the lug 28 of the bar 26 is passed through that plane including the axis of the shaft 19 and the lug 29, the spring 30 acts to continue the movement thereof regardless of the direction of such initial movement.

Mounted in one wall of the housing are contacts 33 and 34, one of which is engaged by the bar 26 when the same is at one extremity of its movement and the other of which is engaged by the opposite end of the bar when the bar is at the other extremity of its movement. Mounted upon the opposite wall of the casing are contacts 35, 36 and 36ª, the contact 35 being engaged by one end of the bar 26 when the opposite end thereof is engaged with the contact 33 of the opposite wall. The opposite end of the bar 26 is engaged with the contacts 36 and 36ª when the bar is engaged with the contact 34 so that means are provided for electrically connecting the contacts 33 and 35 or the contacts 34 and 36 and 36ª which are controlled by the heads or buttons 32.

The disk 22 has seated therein contacts 37 and 38, these contacts being preferably mounted in the edge of the disk. Mounted upon the table 14 are brush holders 39 having brushes 40, 41 and 42 therein, the brushes being insulated from the housing 12 and from one another. The contacts 37 and 38 are so constructed that upon swinging movement of the disk in one direction the contact 38 is simultaneously engaged by the brushes 40 and 41 and electrically connects the same and when the disk is swung in the opposite direction the contact 37 of the disk electrically connects the brushes 41 and 42.

The disk 22 is provided at that side thereof remote from the contacts 37 and 38 with an elongation or extension 43 having formed therein a notch 44. Secured to the steering wheel 11 is a clamping band 45 by means of which an actuating member 46 may be adjustably secured thereto. The actuating member may be either carried directly by the band as illustrated in Figure 8, or clamped against the steering post thereby, as indicated in Figure 4. In the former figure the actuating member is in the form of two ears 47 carried by the yoke or clamp 45 through which extends a securing element threaded in one thereof. This securing element forms a pivot for an arm 48, the end of which is provided with a finger 49 for engagement in the notch 44 of the disk 22. In the latter figure a body 50 is provided adapted to abut the steering wheel and be clamped therein by the band 45, this body being provided at its ends with the ears 47 for the reception of the arm 48.

As a means for holding the arm 48 perpendicular to the steering post and at the same time to permit yielding thereof for a purpose presently to appear, a spring 48′ is provided having a portion thereof disposed intermediate the ears 47 which abuts against the lower end of the arm 48 to maintain the same in such position. If the arm be moved to one side or the other of its proper position about its pivot, the spring will yield but upon release of the force which has moved the arm will again return the arm to its normal position. The importance of this construction will be rendered obvious when it is considered that the hub of a steering wheel is of considerable size and the steering wheel in many instances is rotated through substantially three-fourths of a revolution. It will be obvious that when so rotated the arm 48 or more particularly the finger 49 thereof must at a certain point leave the notch 44 of the disk 43 or this notch must be made of abnormal size and thereby preclude accurate adjustment of the disk. It will be obvious that in moving about the wheel it is altogether possible that the hand or some portion of the clothing may come in contact with the disk while the same is released, tending to shift the same a short distance to one side or the other and should this shifting occur while the arm is released and before its return, the arm, if solid, when engaging the disk would cause a breakage either of the arm or of the disk. However, with this yielding construction, the arm will cam upon the face of the disk moving toward the steering wheel to pass about the disk until it arrives at the notch when it will be thrown forwardly by its spring to engage therein. The contacts 37 and 38 will be made of sufficient length to insure connection of their normally engaged brush with the brush 41 after the finger 49 has left the notch 44, and the spring 24 will act as a brake to hold the disk against rotation and thereby normally maintain the disk with its notch in position to receive the finger.

In the use of the device, the brush 41 and contacts 33 and 34 will be electrically connected with one terminal of a source of current B, the opposite terminal of which is grounded. The brushes 40 and 42 will be electrically connected with the contacts 36 and 36ª and these contacts in turn will be electrically connected with the illuminating elements 51 of their corresponding curve light C. The contact 35 will be connected in parallel with the headlight bulbs 52. It will be seen that upon rotation of the steering wheel in the direction of the arrow in Figure 3, the disk 22 through its engagement by the finger will be rotated to bring the contact 37 into engagement with the brushes 42 and 41, resulting in an electrical connection of these brushes and consequently the completion of a circuit from the battery through the brush 41, contact 37, brush 42, contact 36 or 36ª, the corresponding curve light element 51 and to the battery through the ground. Upon rotation of the steering wheel in the opposite direction the circuit is completed through the brushes 41 and 40 and the contact 38 of the disk. Assuming the bar 26 to be in the position shown in Figure 5, the headlights are illuminated and the curve lights will only be illuminated during those periods when the brushes 40 and 41 or 41 and 42 are connected and then only a single curve light. However, by manipulation of the buttons 32 to bring the bar to the position where it connects the contacts 34 and 36 and 36ª, the headlights are extinguished and the curve lights simultaneously illuminated, thus permitting the use of these curve lights as dimmers.

It will be obvious that practically considered the contacts 40 and 36 and 42 and 36ª are to all intents and purposes the same contacts. That is to say, being electrically connected and interlocking in their operation, the contacts 40 and 36 might be considered as a single contact and the contacts 42 and 36ª as a single contact. Similarly, the contacts 33 and 34 might be simply considered as a means for connecting the manually operated switch blade 26 in circuit with a source of current. With this in view it will be clearly seen that the complete switch formed by the combination of manually and automatically controlled switches has a pair of contacts 40, 36 and 42, 36ª having means for connecting the same in separate circuits and the movable switch element 22 for alternately connecting these contacts with a source of electrical energy. This combination further includes a third contact having means for connecting the same in a further circuit, the headlight circuit, and a second movable switch element, the bar 26, which is engageable with the last named contact to close the circuit to the headlights. This last named switch element 26 being further simultaneously engageable with said pair of contacts when it is disengaged from the third contact.

It will be obvious that many changes are possible in the construction as hereinbefore set forth. The most notable of these is that instead of employing a plurality of contacts upon the disk, a single contact 53 may be employed which normally engages the brush 41 and which is by oscillation of the disk caused to connect either the brushes 41 and 40 or 41 and 42. It is furthermore advantageous under many circumstances to provide a construction wherein the bar 26 may be employed to complete the circuits not only separately but simultaneously, and such a construction we have illustrated in Figure 5 in dotted lines, wherein the contacts 33, 35, 36 and 36ª have been elongated to a point where they are all engaged by the bar 26 when the lug 28 of the bar is in a direct line between the lug 29 of the housing 12 and the axis of the shaft 19. At this point the spring 30 does not act to move the bar in either direction and the frictional engagement thereof with the contacts will prove sufficient to hold the same against movement. In this position it will be obvious that a circuit is completed from the battery through the contacts 33 to the contact 35 and to the headlights and through the contacts 36 and 36ª to each of the illuminating elements 51 of the curve lights so that the headlights and curve lights may be simultaneously illuminated. Many other similar changes being possible without in any manner departing from the spirit of our invention, we do not limit ourselves to the specific structure hereinbefore set forth except as hereinafter claimed.

We claim:—

1. In a steering post switch and in combination with stationary and moving parts of the steering mechanism of a vehicle, a housing adapted to be clamped upon the stationary portion of the steering mechanism and including a table portion and side walls extending between the table portion and such stationary part, a pivot member directed through the table and embodying portions extending interiorly and exteriorly of the casing, a switch blade mounted upon that portion of the pivot within the casing, contact elements carried by opposed walls of the casing with which the switch element coacts, means extending through the wall of the casing for shifting said switch element for engagement with said contacts, contact brushes mounted upon the table exteriorly of the casing and a disk mounted upon that portion of the pivot member exteriorly of the casing and embodying means for electrically connecting certain of said contacts upon rotation in either direction, and means carried by the moving part of the steering mechanism and engaging said disk for rotating the same upon rotation of said moving part.

2. In an electric switch, a pair of contacts having means for connecting the same in separate circuits, a movable switch element for alternately connecting said contacts with a source of electrical energy, a third contact having means for connecting the same in a further circuit, and a second movable switch element having means for connecting the same in the last named circuit and engageable with the last named contact for closing said last named circuit, the second movable switch element being further simultaneously engageable with said pair of contacts when disengaged from the third contact.

3. In an electric switch, a pair of contacts having means for connecting the same in separate circuits, a movable switch element for alternately connecting said contacts with a source of electrical energy, a third contact having means for connecting the same in a further circuit, a second movable switch element having means for connecting the same in the last named circuit and engageable with the last named contact for closing said last named circuit, the second movable switch element being further simultaneously engageable with said pair of contacts when disengaged from the third contact, the first named movable switch element having means for operatively connecting the same to the rotatable steering post of a vehicle, and manually operable means for moving the second named movable switch element.

4. In an electric switch, a pair of contacts having means for connecting the same in separate circuits, a movable switch element for alternately connecting said contacts with a source of electrical energy, a third contact having means for connecting the same in a further circuit, a second movable switch element having means for connecting the same in the last named circuit and engageable with the last named contact for closing said last named circuit, the second movable switch element being further simultaneously engageable with said pair of contacts when disengaged from the third contact, the first named movable switch element having means for operatively connecting the same to a rotating actuating member, and manually operable means for moving said second named movable switch element.

In testimony whereof we hereunto affix our signatures.

WILBUR A. LAYCOCK.
JOHN C. FARRAR.
HARRY H. WOLBERT.